United States Patent
Shin et al.

(10) Patent No.: US 7,103,624 B2
(45) Date of Patent: Sep. 5, 2006

(54) COMPARATOR CIRCUIT AND METHOD

(75) Inventors: Ji-Sun Shin, Seoul (KR); Jae-Jin Lee, Seoul (KR); You-Pyo Hong, Seoul (KR)

(73) Assignee: Samsung Electronics Ltd., Co., Gyeonggi-do (KR)

( * ) Notice: Subject to any disclaimer, the term of this patent is extended or adjusted under 35 U.S.C. 154(b) by 605 days.

(21) Appl. No.: 10/368,397

(22) Filed: Feb. 20, 2003

(65) Prior Publication Data
US 2004/0039770 A1    Feb. 26, 2004

(30) Foreign Application Priority Data
Aug. 26, 2002    (KR)    ............... 10-2002-0050533

(51) Int. Cl.
*G06F 7/02* (2006.01)
(52) U.S. Cl. .................... 708/671; 340/146.2
(58) Field of Classification Search ............... 708/207, 708/671
See application file for complete search history.

(56) References Cited

U.S. PATENT DOCUMENTS

| | | | | |
|---|---|---|---|---|
| 4,728,927 A | * | 3/1988 | Aman | 340/146.2 |
| 4,933,662 A | * | 6/1990 | Szczepanek | 340/146.2 |
| 5,281,946 A | * | 1/1994 | Van Le | 340/146.2 |
| 6,014,074 A | * | 1/2000 | Park | 340/146.2 |
| 6,177,862 B1 | * | 1/2001 | Sakata | 340/146.2 |

* cited by examiner

*Primary Examiner*—Chuong D. Ngo
(74) *Attorney, Agent, or Firm*—Harness, Dickey & Pierce

(57) ABSTRACT

A binary comparator circuit and a binary data comparison method for reducing a layout area and power consumption and/or increasing comparison speed. The binary data comparison circuit and method receive all N bits of each of a first binary data $A_{n-1}A_{n-2} \ldots A_1A_0$ and a second binary data $B_{n-1}B_{n-2} \ldots B_1B_0$, and compare the first binary data and the second binary data to determine which of the first binary data and the second binary data is larger according to the following equation:

$$F(A \leq B) = A_{(n-1)}' \cdot B_{(n-1)} + (A_{(n-1)}' + B_{(n-1)}) \cdot \{A_{(n-2)}' \cdot B_{(n-2)} + (A_{(n-2)}' + B_{(n-2)}) \ldots \{A_1' \cdot B_1 + (A_1' + B_1) \cdot (A_0' + B_0)\}\}$$

where subscripts denote a position of a bit of the N-bit binary data and a prime (') indicates that a bit is inverted, and outputting a signal corresponding to the comparison result.

17 Claims, 2 Drawing Sheets

FIG. 2

| A[3:0] | A'[3:0] | B[3:0] | F(=(A≤B)) |
|--------|---------|--------|-----------|
| 0000   | 1111    | 0000   | 1         |
| 1111   | 0000    | 0000   | 0         |
| 0001   | 1110    | 0000   | 0         |
| 0010   | 1101    | 0001   | 0         |
| 0001   | 1110    | 0010   | 1         |
| 0100   | 1011    | 0010   | 1         |
| 1111   | 0000    | 1111   | 1         |
| 0001   | 1110    | 0001   | 1         |
| 0010   | 1101    | 0010   | 1         |
| 0100   | 1011    | 0100   | 1         |
| 0111   | 1000    | 1000   | 1         |

US 7,103,624 B2

COMPARATOR CIRCUIT AND METHOD

CROSS-REFERENCE TO RELATED APPLICATIONS

This nonprovisional patent application claims priority under 35 U.S.C. § 119, of Korean Patent Application No. 2002-50533, the entire contents of which are hereby incorporated by reference.

BACKGROUND OF THE INVENTION

1. Field of the Invention

The present invention relates to a comparator circuit, and more particularly, to a comparator circuit implemented in a memory chip.

2. Description of the Related Art

In general, a binary comparator circuit is used for receiving two binary numbers or streams (also referred to as "data") and determining which is larger. The simplest form of a binary comparator circuit employs a method of receiving two binary numbers or streams to be compared, comparing the received two binary numbers or streams sequentially from MSB (Most Significant Bit) to LSB (Least Significant Bit), and determining whether one of the two binary numbers or streams is larger than the other based on the result of the comparison.

For example, if a single bit output of a conventional binary comparator circuit is 1, this means that one of two binary data is larger than the other. If a single output of the conventional binary comparator circuit is 0, this means that one of two binary data is not larger than the other. Such a conventional binary comparator circuit has a problem where the comparison speed of the binary comparator circuit decreases in proportion to the number of bits of input data.

A comparator circuit disclosed in U.S. Pat. No. 5,592,142 is directed to a method for receiving two data, calculating all cases simultaneously in which one of the received data may be determined to be larger than the other, and comparing the data to determine whether one of the cases is true. This conventional comparator circuit uses a gate as a fundamental unit and a critical path of the comparator circuit includes three gates. This comparator circuit requires numerous gates to compare two data. As a result, this conventional comparator circuit requires a large layout area and consumes large amount of power.

SUMMARY OF THE INVENTION

In an exemplary embodiment, the present invention provides a comparator circuit and a data comparison method that reduce a layout area and power consumption and/or increase comparison speed.

In an exemplary embodiment, the present invention is directed to a binary data comparison method comprising receiving all 4 bits of each of a first binary data $A_3A_2A_1A_0$ and a second binary data $B_3B_2B_1B_0$ and simultaneously comparing the first binary data and the second binary data to determine which of the first binary data and the second binary data is larger than the other bitwise according to the following equation:

$$F(A \leq B) = A_3' \cdot B_3 + (A_3' + B_3) \cdot \{A_2' \cdot B_2 + (A_2' + B_2) \cdot \{A_1' \cdot B_1 + (A_1' + B_1) \cdot (A_0' + B_0)\}\}$$

where $A_3'$ denotes an inverted MSB of the first binary data, $A_2'$ denotes an inverted second bit from the LSB of the first binary data, $A_1'$ denotes an inverted first bit from the LSB of the first binary data, $A_0'$ denotes an inverted LSB of the first binary data, $B_3$ denotes the MSB of the second binary data, $B_2$ denotes a second bit from the LSB of the second binary data, $B_1$ denotes a first bit from the LSB of the second binary data, and $B_0$ denotes an LSB of the second binary data, and outputting a signal corresponding to the comparison result.

In an exemplary embodiment, when outputting a signal, if the first binary data is smaller than or equal to the second binary data, the signal corresponding to the comparison result is logic level "high".

In another exemplary embodiment, the present invention provides a binary data comparison method comprising receiving all N bits of each of a first binary data $A_{n-1}A_{n-2} \ldots A_1A_0$ and a second binary data $B_{n-1}B_{n-2} \ldots B_1B_0$ and simultaneously comparing the first binary data and the second binary data to determine which of the first binary data and the second binary data is larger than the other bitwise according to the following equation:

$$F(A \leq B) = A_{(n-1)}' \cdot B_{(n-1)} + (A_{(n-1)}' + B_{(n-1)}) \cdot \{A_{(n-2)}' \cdot B_{(n-2)} + (A_{(n-2)}' + B_{(n-2)}) \ldots \{A_1' \cdot B_1 + (A_1' + B_1) \cdot (A_0' + B_0)\}\}$$

where subscripts denote the position of a bit of an N-bit binary data and a prime (') indicates that a bit is inverted, and outputting a signal corresponding to the comparison result.

In another exemplary embodiment, when outputting a signal, if the first binary data is smaller than or equal to the second binary data, the signal corresponding to the comparison result is logic level "high".

In another exemplary embodiment, the present invention provides a binary comparator circuit for receiving and comparing all 4 bits of each of a first binary data and a second binary data, the binary comparator circuit comprising a first node, a second node, a third node, a fourth node, a fifth node, a first transistor which is connected between a supply voltage and a first node and precharges the first node to the supply voltage level in response to a clock signal, a second transistor which is connected between the first node and the second node and includes a gate receiving the result of performing an OR operation on the MSB of the second binary data, and the inverted MSB of the first binary data, a third transistor which is connected between the second node and the third node and includes a gate receiving the result of performing an OR operation on the second bit from the LSB of the second binary data and the inverted second bit from the LSB of first binary data, a fourth transistor which is connected between the third node and the fourth node and includes a gate receiving the result of performing an OR operation on the first bit from the LSB of the second binary data and the inverted first bit from the LSB of the first binary data, a fifth transistor which is connected between the fourth node and the fifth node and includes a gate receiving the result of performing an OR operation on the LSB of the second binary data and the inverted LSB of the first binary data, a sixth transistor which is connected between the third node and the fifth node and includes a gate receiving the result of performing an AND (logical multiplication) operation on the first bit from the LSB of the second binary data and the inverted first bit from the LSB of the first binary data, a seventh transistor which is connected between the second node and the fifth node and includes a gate receiving the result of performing an AND operation on the second bit from the LSB of the second binary data and the inverted second bit from the LSB of the first binary data, an eighth transistor which is connected between the first node and the fifth node and includes a gate receiving the result of performing an AND operation on the MSB of the second binary data and the inverted MSB of the first binary data and a ninth transistor which is connected between the fifth node and a ground voltage and pulls down the fifth node to the ground voltage level in response to the clock signal.

In another exemplary embodiment, the binary comparator circuit further comprises an inversion circuit which is connected to the first node, receives and inverts a voltage of the first node.

In another exemplary embodiment, the first through the ninth transistors are MOS transistors.

In another exemplary embodiment, the present invention provides a binary comparator circuit for receiving and comparing a plurality of bits constituting each of a first binary data and a second binary data, the binary comparator circuit comprising a first switching circuit which is connected between a supply voltage and a first node and is switched in response to a clock signal, a second switching circuit which is connected between a second node and a ground voltage and is switched in response to the clock signal, a plurality of third switching circuits which include a first terminal and a second terminal respectively, are connected serially between the first node and the second node, and are switched in response to corresponding first logic signals and a plurality of fourth switching circuits which are connected between the first terminal and the second terminal of the plurality of third switching circuits, excluding the circuit receiving LSBs of the first binary data and the second binary data, and are switched in response to corresponding second logic signals.

In another exemplary embodiment, the first logic signal is the result of performing an OR operation on a corresponding bit of an inverted signal of the first binary data and a corresponding bit of a signal of the second binary data.

In another exemplary embodiment, the second logic signal is the result of performing an AND operation on a corresponding bit of an inverted signal of the first binary data and a corresponding bit of a signal of the second binary data.

In another exemplary embodiment, each of the switching circuits is a MOS transistor.

In another exemplary embodiment, the binary comparator circuit further comprises an inversion circuit which is connected to the first node, receives and inverts a voltage from the first node.

In another exemplary embodiment, the present invention provides a binary comparator circuit for receiving and comparing a plurality of bits constituting each of a first binary data and a second binary data, the binary comparator circuit comprising a first switching circuit, connected between a supply voltage and a first node, switchable in response to a clock signal, a second switching circuit, connected between a second node and a ground voltage, switchable in response to the clock signal, a first group of N (where N is an integer greater than 1) switching circuits, connected serially between the first node and the second node, switchable in response to corresponding first logic signals, and a second group of (N−1 switching circuits, each connected in parallel with two or more of the N switching circuits of the first group such that the $(N-1)_x$ switching circuit of the second group is in parallel with the $N_0$ through $N_{x+1}$ switching circuits of the first group, where x=0 . . . (N−1), switchable in response to corresponding second logic signals.

BRIEF DESCRIPTION OF THE DRAWINGS

The present invention will become more apparent by describing in detail exemplary embodiments thereof with reference to the attached drawings in which:

FIG. 2 is an example of inputted/outputted data of a binary comparator circuit according to an exemplary embodiment of the present invention.

DETAILED DESCRIPTION OF EXEMPLARY EMBODIMENTS OF THE INVENTION

Figure 1:
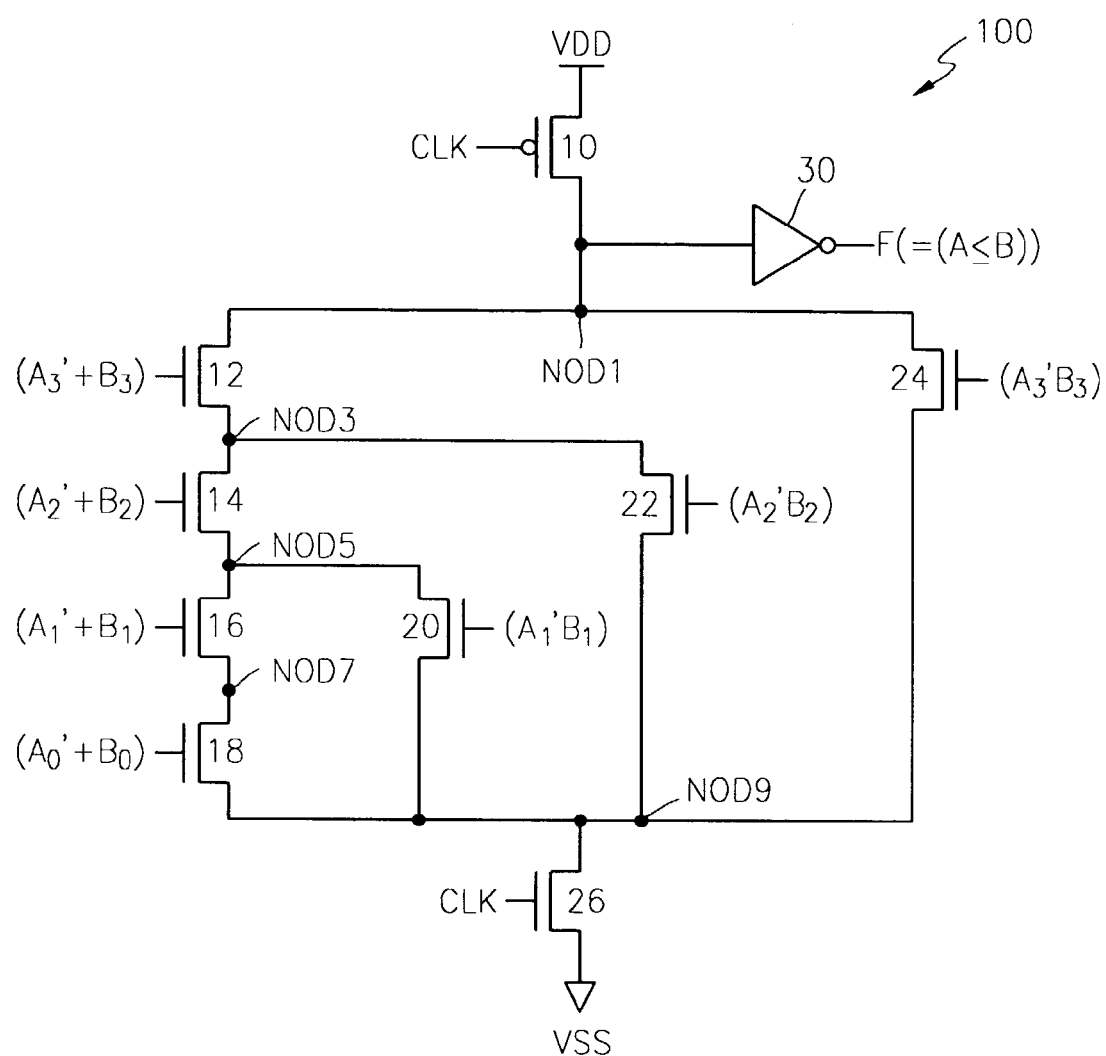
FIG. 1 is a view of a binary comparator circuit according to an exemplary embodiment of the present invention.

In order to fully understand the present invention and the exemplary embodiments thereof, it is necessary to refer to the accompanying drawings, in which the exemplary embodiments of the invention are shown. Hereinafter, exemplary embodiments of the present invention will be described in detail with reference to the attached drawings. Each element is denoted by the same unique reference numeral throughout the drawings.

FIG. 1 illustrates a comparator circuit according to an exemplary embodiment of the present invention. Referring to FIG. 1, a comparator circuit 100 according to an exemplary embodiment of the present invention receives two binary data, i.e., a first binary data $A[3:0]=A_3A_2A_1A_0$ and a second binary data $B[3:0]=B_3B_2B_1B_0$, and outputs a comparison result by using Equations 1 and 2 below. It should be noted the binary comparator circuit according to exemplary embodiments of the present invention can be applied to a variety of data formats, sizes, bases, and number of inputs.

$$F(A \leq B) = A_3' \cdot B_3 + (A_3 \cdot B_3')' \cdot \{A_2' \cdot B_2 + (A_2 \cdot B_2')' \cdot (A_1' \cdot B_1 + (A_1 \cdot B_1')' \cdot (A_0 \cdot B_0')')\} \quad \text{[Equation 1]}$$

According to De Morgan's theorem, Equation 1 can be transformed into Equation 2.

$$F(A \leq B) = A_3' \cdot B_3 + (A_3' + B_3) \cdot \{A_2' \cdot B_2 + (A_2' + B_2) \cdot \{A_1' \cdot B_1 + (A_1' + B_1) \cdot (A_0' + B_0)\}\}, \quad \text{[Equation 2]}$$

where $A_3'$ denotes the inverted MSB of the first binary data, $A_2'$ denotes the inverted second bit from the LSB of the first binary data, $A_1'$ denotes the inverted first bit from the LSB of the first binary data and $A_0'$ denotes the inverted LSB of the first binary data.

In addition, $B_3$ denotes the MSB of the second binary data, $B_2$ denotes the second bit from the LSB of the second binary data, $B_1$ denotes the first bit from the LSB of the second binary data and $B_0$ denotes the LSB of the second binary data.

Two single-bit binary data, A and B, may be compared via Equation 3 below.

$$F(A \leq B) = (A_0' + B_0) \quad \text{[Equation 3]}$$

Two 2-bit binary data A and B may be compared via Equation 4 below.

$$F(A \leq B) = \{A_1' \cdot B_1 + (A_1' + B_1) \cdot (A_0' + B_0)\} \quad \text{[Equation 4]}$$

Two 3-bit binary data A and B may be compared via Equation 5 below.

$$F(A \leq B) = A_2' \cdot B_2 + (A_2' + B_2) \cdot \{A_1' \cdot B_1 + (A_1' + B_1) \cdot (A_0' + B_0)\} \quad \text{[Equation 5]}$$

Therefore, Equations 1 to 5 can be generalized as Equation 6 below.

$$F(A \leq B) = A_{(n-1)}' \cdot B_{(n-1)} + (A_{(n-1)}' + B_{(n-1)}) \cdot \{A_{(n-2)}' \cdot B_{(n-2)} + (A_{(n-2)}' + B_{(n-2)}) \ldots \{A_1' \cdot B_1 + (A_1' + B_1) \cdot (A_0' + B_0)\}\}$$ [Equation 6]

Referring to Equations 1 to 6, when $A \leq B$, F has a value of 1(True). For example, if $A_3B_3$ is equal to 01, F is equal to 1. Likewise, if $A_3$ is equal to $B_3$ and $A_2B_2$ is equal to 01, then F is equal to 1, which means binary data B is larger then binary data A.

Referring to Equations 1 to 6, subscripts denote the position of a bit in an N-bit binary data and a prime (') indicates that a bit is inverted.

In the binary comparator circuit 100 shown in FIG. 1, Equation 2 is implemented in a memory chip. Referring to FIG. 1, the binary comparator circuit 100 comprises a plurality of transistors 10 to 26 and an inverter 30. The binary comparator circuit 100 is formed in a dynamic circuit style and is implemented in a TSPC (True-Single Phase Clocking) style. However, other circuits and/or implementation styles could also be used, as would be apparent to one of ordinary skill in the art.

A PMOS transistor 10 is connected between a supply voltage VDD and a node NOD1. A clock signal CLK is input to a gate of the PMOS transistor 10. The PMOS transistor 10 pulls up the node NOD1 to the supply voltage VDD level in response to the clock signal CLK.

An NMOS transistor 12 is connected between the node NOD1 and a node NOD3. The result of performing an OR operation on the MSB of binary data B, $B_3$ and the inverted MSB of binary data A, $A_3'$ is input to a gate of NMOS transistor 12.

An NMOS transistor 14 is connected between the node NOD3 and a node NOD5. The result of performing an OR operation on the second bit from the LSB of binary data B, $B_2$ and the inverted second bit from the LSB of binary data A, $A_2'$ is input to a gate of NMOS transistor 14.

An NMOS transistor 16 is connected between the node NOD 5 and a node NOD7. The result of performing an OR operation on the first bit from the LSB of binary data B, $B_1$ and the inverted first bit from the LSB of binary data A, $A_1'$ is input to a gate of NMOS transistor 16.

An NMOS transistor 18 is connected between the node NOD 7 and a node NOD9. The result of performing an OR operation on the LSB of binary data B, $B_0$ and the inverted LSB of binary data A, $A_0'$ is input to a gate of NMOS transistor 18.

An NMOS transistor 20 is connected between the node NOD 5 and the node NOD9. The result of performing an AND (logical multiplication) operation on the first bit from the LSB of binary data B, $B_1$ and the inverted first bit from the LSB of binary data A, $A_1'$ is input to a gate of NMOS transistor 20.

An NMOS transistor 22 is connected between the node NOD3 and the node NOD9. The result of performing an AND operation on the second bit from the LSB of binary data B, $B_2$ and the inverted second bit from the LSB of binary data A, $A_2'$ is input to a gate of NMOS transistor 22.

An NMOS transistor 24 is connected between the node NOD1 and NOD9. The result of performing an AND operation on the MSB of binary data B, $B_3$ and the inverted MSB of binary data A, $A_3'$ is input to a gate of NMOS transistor 24.

Each of the serially connected transistors 12, 14, 16 and 18 comprises a first terminal and a second terminal, is connected between corresponding nodes (e.g. NMOS transistor 12 is connected between the node NOD1 and the node NOD3, and NMOS transistor 14 is connected between the node NOD3 and the node NOD5), and is switched in response to an OR signal input to a gate corresponding to each transistor (each of transistors 12, 14, 16 and 18).

Transistors 24, 22 and 20 are connected between the node NOD9 and the nodes to which the first terminals of transistors 12, 14 and 16, excluding transistor 18 receiving a logic combination of the LSBs of binary data A and B, are connected (the node NOD1, the node NOD3 and the node NOD5). Then, transistors 24, 22 and 20 are switched in response to corresponding AND signals.

An NMOS transistor 26 is connected between the node NOD9 and a ground voltage VSS. A clock signal CLK is input to a gate of NMOS transistor 26. An input terminal of an inverter 30 is connected to the node NOD1, receives an output voltage from the node NOD1, and outputs the inverted signal ((F=A≤B)).

Referring to FIG. 1, operations of a binary comparator circuit 100 according to an exemplary embodiment of the present invention will be described below.

When the clock signal CLK is in a first state (e.g. when logic is a "low" signal), the PMOS transistor 10 pulls up the node NOD1 to the supply voltage VDD level. Accordingly, an output signal of the binary comparator circuit 100 is a logic "low" signal.

When the clock signal CLK is in a second state (e.g. when a logic level is "high"), the binary comparator circuit 100 receives the two 4-bit input binary data A and B, compares the two 4-bit input binary data A and B to determine which of the two 4-bit input binary data A and B is larger than the other according to Equation 2 and outputs a comparison result (F).

The output signal (F) of the binary comparator circuit 100 is 1 (a second state or logic level "high") or 0 (a first state or logic level "low"). If $A \leq B$, the output signal (F) of the binary comparator circuit 100 is 1. Otherwise, the output signal (F) of the binary comparator circuit 100 is 0.

FIG. 2 shows examples of input/output data of a binary comparator circuit according to an exemplary embodiment of the present invention. Referring to FIGS. 1 and 2, the node NOD1 may be precharged to the supply voltage VDD level in response to the clock signal CLK.

The following descriptions concern the comparison operations of the binary comparator circuit 100 when the clock signal CLK is in a second state.

When one input binary data is $A[3:0]=A_3A_2A_1A_0=0000_2$, and another input binary data is $B[3:0]=B_3B_2B_1B_0=0000_2$, then inverted input binary data is $A'[3:0]=A_3'A_2'A_1'A_0'=1111_2$. Therefore, NMOS transistors 12, 14, 16 and 18 are all turned on in response to logic signals ($A_3'+B_3$, $A_1'+B_2$, $A_1'+B_1$, $A_0'+B_0$) input to corresponding gates. Accordingly, the node NOD1, which is precharged to the supply voltage VDD level, is pulled down to a ground voltage VSS level and so an output signal of the inverter 30 transits from logic level "low" to logic level "high". Therefore, the output signal (F) of the binary comparator circuit 100 is 1. In other words, the condition $A \leq B$ is met.

In addition, when one input binary data A[3:0] is $1111_2$ and another input binary data B[3:0] is $0000_2$, inverted input binary data A'[3:0] is 0000. Therefore, logic signals ($A_3'+B_3$, $A_1'+B_2$, $A_1'+B_1$, $A_0'+B_0 A_1'B_1$, $A_2'B_2$, $A_3'B_3$) input to gates of corresponding NMOS transistors (12, 14, 16, 18, 20, 22 and 24) correspond to logic level "low".

Each logic signal of $A_3'+B_3$, $A_1'+B_2$, $A_1'+B_1$, $A_0'+B_0$, $A_1'B_1 A_2'B_2$, $A_3'B_3$ can be generated by a corresponding OR circuit or AND circuit. Accordingly, the inverter 30 receives output signals from the node NOD1 precharged to the supply voltage VDD level and outputs the inverted signal (F). Since the output signal (F) of the binary comparator circuit 100 is logic level "low", the two input binary data A[3:0] and B[3:0] cannot meet the condition A≦B.

In another example, when one input binary data A[3:0] is 0001 and another input binary data B[3:0] is 0010, then $A_3'A_2'A_1'A_0'$ is 1110. Therefore, the node NOD1 is connected to the ground voltage VSS via NMOS transistors 12, 14, 20 and 26. Accordingly, the node NOD1, which is precharged to the supply voltage VDD level, is pulled down to the ground voltage VSS level and so an output signal of the inverter 30 transits from logic level "low" to logic level "high". Therefore, the output signal (F) of the binary comparator circuit 100 is 1. In other words, the condition A≦B is met.

In yet another example, when one input binary data A[3:0] is 0111 and another input binary data B[3:0] is 1000, then A'[3:0] is 1000. Therefore, the node NOD1 is connected to the ground voltage VSS via NMOS transistors 24 and 26. Accordingly, the node NOD1, which is precharged to the supply voltage VDD level, is pulled down to the ground voltage VSS level and so an output signal of the inverter 30 transits from logic level "low" to logic level "high". Therefore, the output signal (F) of the binary comparator circuit 100 is 1. In other words, the condition A≦B is met.

Referring to FIG. 1, an exemplary circuit structure for receiving and comparing two 2-bit binary data A and B may include transistors 10, 16, 18, 20 and 26. In addition, a circuit structure for receiving and comparing two 3-bit binary data A and B may include transistors 10, 14, 16, 18, 20, 22 and 26. Therefore, a circuit structure for receiving and comparing two N-bit (where N is a natural number) binary data A and B can be easily understood through Equation 6 and FIG. 1.

The binary comparator circuit 100 according to an exemplary embodiment of the present invention can be used for a branch prediction circuit and an ACS (Add-Compare-Select) circuit of a Viterbi decoder.

The binary comparator circuit 100 according to an exemplary embodiment of the present invention, in which a few transistors 12, 14, 16 and 18 are connected serially, can also decrease deceleration of operations due to a body effect.

As described above, the binary comparator circuit according to an exemplary embodiment of the present invention is implemented by transistors formed in a dynamic circuit style and may improve the speed of data comparison, i.e., operation speed, with a reduced number of transistors. Moreover, as a result of the reduced number of transistors, the required layout area and power consumption of the binary comparator circuit implemented in a semiconductor chip are reduced.

A data comparison method according to an exemplary embodiment of the present invention is advantageous in that rapid data comparison is possible after receiving data. Comparator circuits and comparison methods according to exemplary embodiments of the present invention may be implemented in a VLSI (Very Large Scale Integrated Circuit) and may enable high-speed comparison of two binary data to determine which of the two binary data is larger than the other in parallel.

In the exemplary embodiments of the present invention described above, various signals have been described a having "high" or "low" levels. These values could be reversed as would be known to one of ordinary skill in the art. In a related manner, the circuit implementation of FIG. 2 is exemplary and could be represented by various other equivalent circuits, as would also be known to one of ordinary skill in the art.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A binary data comparison method comprising:
 (a) receiving all 4 bits of each of a first binary data $A_3A_2A_1A_0$ and a second binary data $B_3B_2B_1B_0$ in a binary comparator circuit; and
 (b) comparing the first binary data and the second binary data received by the binary comparison circuit to determine which of the first binary data and the second binary data is larger according to the following equation:

$$F(A \leq B) = A_3' \cdot B_3 + (A_3' + B_3) \cdot \{A_2' \cdot B_2 + (A_2' + B_2) \cdot \{A_1' \cdot B_1 + (A_1' + B_1) \cdot (A_0' + B_0)\}\},$$

where $A_3'$ denotes an inverted MSB of the first binary data, $A_2'$ denotes an inverted second bit from the LSB of the first binary data, $A_1'$ denotes an inverted first bit from the LSB of the first binary data, $A_0'$ denotes an inverted LSB of the first binary data, $B_3$ denotes an MSB of the second binary data, $B_2$ denotes a second bit from the LSB of the second binary data, $B_1$ denotes a first bit from the LSB of the second binary data, and $B_0$ denotes an LSB of the second binary data, and outputting a signal from the binary comparator circuit corresponding to the comparison result.

2. The binary data comparison method of claim 1, wherein if the first binary data is smaller than or equal to the second binary data, the signal corresponding to the comparison result is logic level "high".

3. A binary data comparison method comprising:
 (a) receiving all N bits of each of a first binary data $A_{n-1}A_{n-2} \ldots A_1A_0$ and a second binary data $B_{n-1}B_{n-2} \ldots B_1B_0$ in a binary comparator circuit; and
 (b) comparing the first binary data and the second binary data received by the binary comparator circuit to determine which of the first binary data and the second binary data is larger according to the following equation:

$$F(A \leq B) = A_{(n-1)}' \cdot B_{(n-1)} \cdot \{A_{(n-2)}' \cdot B_{(n-2)} + (A_{(n-2)}' + B_{(n-2)}) \ldots \{A_1' \cdot B_1 + (A_1' + B_1) \cdot (A_0' \cdot B_0)\}\}$$

where subscripts denote a position of a bit of the N-bit binary data and a prime (') indicates that a bit is inverted, and outputting a signal, from the binary comparator circuit corresponding to the comparison result.

4. The data comparison method of claim 3, wherein if the first binary data is smaller than or equal to the second binary data, the signal corresponding to the comparison result is logic level "high".

5. A binary comparator circuit for receiving and comparing all 4 bits of each of a first binary data and a second binary data, the binary comparator circuit comprising:
 a first transistor, connected between a supply voltage and a first node, which precharges the first node to a supply voltage level in response to a clock signal;
 a second transistor, connected between the first node and a second node, including a gate receiving a result of an OR operation on a MSB of the second binary data, and an inverted MSB of the first binary data;

a third transistor, connected between the second node and a third node, including a gate receiving the result of an OR operation on a second bit from the LSB of the second binary data and an inverted second bit from the first LSB of binary data;

a fourth transistor, connected between the third node and a fourth node, including a gate receiving the result of an OR operation on a first bit from the LSB of the second binary data and an inverted first bit from the LSB of the first binary data;

a fifth transistor, connected between the fourth node and a fifth node, including a gate receiving the result of an AND operation on a LSB of the second binary data and an inverted LSB of the first binary data;

a sixth transistor, connected between the third node and the fifth node, including a gate receiving the result of an AND operation on the first bit from the LSB of the second binary data and the inverted first bit from the LSB of the first binary data;

a seventh transistor, connected between the second node and the fifth node, including a gate receiving the result of an AND operation on the second bit from the LSB of the second binary data and the inverted second bit from the LSB of the first binary data;

an eighth transistor, connected between the first node and the fifth node, including a gate receiving the result of an AND operation on the MSB of the second binary data and the inverted MSB of the first binary data; and a ninth transistor, connected between the fifth node and a ground voltage, for pulling down the fifth node to the ground voltage level in response to the clock signal.

6. The binary comparator circuit of claim 5, further comprising an inversion circuit, connected to the first node, for receiving and inverting a voltage of the first node.

7. The binary comparator circuit of claim 5, wherein the first through the ninth transistors are MOS transistors.

8. A binary comparator circuit for receiving, and comparing a plurality of bits constituting each of a first binary data and a second binary data, the binary comparator circuit comprising;

a first switching circuit, connected between a supply voltage and a first node, switchable in response to a clock signal;

a second switching circuit, connected between a second node and a ground voltage, switchable in response to the clock signal;

a plurality of third switching circuits each include a first terminal and a second terminal, connected serially between the first node and the second node, switchable in response to corresponding first logic signals; and a plurality of fourth switching circuits, connected between the first terminal and the second terminal of the plurality of third switching circuits, excluding the one of plurality of third switching circuits receiving LSBs of the first binary data and the second binary data, switchable in response to corresponding second logic signals.

9. The binary comparator circuit of claim 8, wherein the corresponding first logic signals are the result of an OR operation on a corresponding bit of an inverted signal of the first binary data and a corresponding bit of a signal of the second binary data.

10. The binary comparator circuit of claim 8, wherein the corresponding second logic signals are the result of an AND operation on a corresponding bit of an inverted signal of the first binary data and a corresponding bit of a signal of the second binary data.

11. The binary comparator circuit of claim 8, wherein each of the first through the fourth switching circuits include one or more MOS transistors.

12. The binary comparator circuit of claim 8, further comprising an inversion circuit, connected to the first node, for receiving and inverting a voltage from the first node.

13. A binary comparator circuit for receiving and comparing a plurality of bits constituting each of a first binary data and a second binary data, the binary comparator circuit comprising:

a first switching circuit, connected between a supply voltage and a first node, switchable in response to a clock signal;

a second switching circuit, connected between a second node and a ground voltage, switchable in response to the clock signal;

a first group of N (where N is an integer greater than 1) switching circuits between the first switching circuit and the second switching circuit, each include a first terminal and a second terminal, connected serially between the first node and the second node, switchable in response to corresponding first logic signals; and a second group of (N−1) switching circuits, each connected in parallel with two or more of the N switching circuits of the first group such that the $(N-1)_x$ switching circuit of the second group is in parallel with the $N_0$ through $N_{x+1}$ transistors of the first group, where x=0 ... (N−1), switchable in response to corresponding second logic signals.

14. The binary comparator circuit of claim 13, wherein the corresponding first logic signals are the result of an OR operation on a corresponding bit of an inverted signal of the first binary data and a corresponding bit of a signal of the second binary data.

15. The binary comparator circuit of claim 13, wherein the corresponding second logic signals are the result of an AND operation on a corresponding bit of an inverted signal of the first binary data and a corresponding bit of a signal of the second binary data.

16. The binary comparator circuit of claim 13, wherein each of the first through the fourth switching circuits include one or more MOS transistors.

17. The binary comparator circuit of claim 13, further comprising an inversion circuit, connected to the first node, for receiving and inverting a voltage from the first node.

* * * * *